United States Patent
Lin

(10) Patent No.: US 11,068,358 B2
(45) Date of Patent: Jul. 20, 2021

(54) METHOD FOR BACKING UP AND RESTORING DISC MANAGEMENT INFORMATION

(71) Applicants: Lite-On Electronics (Guangzhou) Limited, Guangzhou (CN); LITE-ON TECHNOLOGY CORPORATION, Taipei (TW)

(72) Inventor: Che-Ching Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 234 days.

(21) Appl. No.: 16/435,647

(22) Filed: Jun. 10, 2019

(65) Prior Publication Data
US 2020/0341865 A1 Oct. 29, 2020

(30) Foreign Application Priority Data

Apr. 23, 2019 (CN) .......................... 201910329455.0

(51) Int. Cl.
*G06F 11/14* (2006.01)
*G11B 17/04* (2006.01)

(52) U.S. Cl.
CPC ...... *G06F 11/1469* (2013.01); *G11B 17/0401* (2013.01)

(58) Field of Classification Search
None
See application file for complete search history.

(56) References Cited

U.S. PATENT DOCUMENTS

| 7,529,166 B2 * | 5/2009 | Uemura | G11B 7/0045 369/47.1 |
| 7,617,426 B2 * | 11/2009 | Hwang | G11B 20/1816 369/47.14 |

(Continued)

FOREIGN PATENT DOCUMENTS

| CN | 101110246 A | 1/2008 |
| CN | 101221776 A | 7/2008 |

OTHER PUBLICATIONS

Office Action issued by China National Intellectual Property Administration dated Apr. 6, 2021.

*Primary Examiner* — William J Klimowicz
(74) *Attorney, Agent, or Firm* — WPAT, PC

(57) ABSTRACT

A method for backing up and restoring a disc management information is disclosed. Firstly, a specified optical disc is loaded into an optical disc drive. After a servo calibration process is performed, the latest update of the disc management information is read from a specified optical disc. If the latest update of the disc management information is read successfully, the optical disc drive enters a normal working state. If the latest update of the disc management information is not read successfully, the latest update of the disc management information is acquired through a processing circuit. Consequently, the optical disc drive enters the normal working state. While the normal working state of the optical disc drive is terminated, the latest update of the disc management information is transmitted to the processing circuit and recorded into the storage device.

13 Claims, 4 Drawing Sheets

(56) References Cited

U.S. PATENT DOCUMENTS

| | | | | |
|---|---|---|---|---|
| 7,831,880 B2* | 11/2010 | Akiyama | ............ | G11B 20/1883 |
| | | | | 714/746 |
| 7,916,584 B2* | 3/2011 | Katsuo | ................. | G11B 27/105 |
| | | | | 369/30.3 |
| 2011/0299369 A1* | 12/2011 | Mutsuro | ............ | G11B 20/1883 |
| | | | | 369/30.06 |

* cited by examiner

METHOD FOR BACKING UP AND RESTORING DISC MANAGEMENT INFORMATION

This application claims the benefit of People's Republic of China Patent Application No. 201910329455.0, filed Apr. 23, 2019, the subject matter of which is incorporated herein by reference.

FIELD OF THE INVENTION

The present invention relates to a method for processing the data of an optical disc, and more particularly to a method for backing up and restoring a disc management information.

BACKGROUND OF THE INVENTION

Nowadays, the storage capacity of the optical disc is gradually increased. The storage capacity of the single-layer Blu-ray disc reaches 25G bytes. The storage capacity of the dual-layer Blu-ray disc reaches 50G bytes. The storage capacity of the triple-layer Blu-ray disc exceeds 100G bytes.

FIG. 1 is a schematic diagram illustrating the data layout of a disc track. For example, the triple-layer Blu-ray disc comprises three layers L0, L1 and L2. Each of the three layers L0, L1 and L2 comprises an inner zone, a data zone and an outer zone.

According to the contents of the specifications, the inner zone of the layer L0 is a lead-in area, and the outer zone of the layer L2 is a lead-out area. In each of the three layers L0, L1 and L2, the data zone comprises a front spare area, a user data area and a rear spare area.

Moreover, plural temporary disc management areas TDMA0~TDMA8 are defined in the disc track. For example, TDMA0, TDMA3 and TDMA4 are included in the lead-in area, the front spare area and the rear spare area of the layer L0, respectively. Moreover, TDMA1, TDMA6 and TDMA5 are included in the inner zone, the front spare area and the rear spare area of the layer L1, respectively. Moreover, TDMA2, TDMA7 and TDMA8 are included in the inner zone, the front spare area and the rear spare area of the layer L2, respectively.

Generally, the temporary disc management area TDMA records the disc management information. For example, when the optical disc is in a sequential recording mode, the disc management information of the temporary disc management area TDMA contains a temporary disc definition structure (TDDS), a temporary defect list (TDFL) and a sequential recording range information (SRRI). When the optical disc is in a random recording mode, the disc management information of the temporary disc management area TDMA contains the temporary disc definition structure (TDDS), the temporary defect list (TDFL) and a space bit map (SBM).

For example, the temporary disc definition structure (TDDS) records the information about the size of the spare area, the size of the temporary disc management area TDMA, the next write address (NWA), and so on. The temporary defect list (TDFL) records the information about the defective track position and the corresponding replacement track position of the optical disc.

Generally, during the operation of the optical disc drive, the disc management information of the temporary disc management area TDMA needs to be continuously updated. Consequently, the optical disc has many temporary disc management areas TDMA for providing a sufficient space of storing the updated disc management information.

When the optical disc is ejected from the optical disc drive, the latest update of the disc management information has to accurately reflect the current status of the optical disc. Consequently, when the optical disc is loaded into the optical disc drive again and an initialization process of the optical disc drive is performed, the optical pickup head is moved to the temporary disc management area TDMA to read the latest update of the disc management information. After the optical disc drive confirms the status of the optical disc, the optical disc drive can be operated normally.

FIG. 2 is a flowchart illustrating an operating method of a conventional optical disc drive. Firstly, the optical disc is loaded into the optical disc drive and an initialization process of the optical disc drive is performed (Step S210). Then, a servo calibration process of the optical disc drive is performed (Step S212). During the servo calibration process, the optical pickup head of the optical disc drive emits a laser beam, and a laser power adjusting procedure, a focusing-on procedure and a tracking-on procedure are performed.

After the servo calibration process is completed, the optical pickup head is moved to the temporary disc management area TDMA to read the latest update of the disc management information. Then, a step S214 is performed to judge whether the latest update of the disc management information is read successfully. If the latest update of the disc management information is read successfully, the optical disc drive confirms the status of the optical disc. Meanwhile, the initialization process of the optical disc drive is completed, and the optical disc drive enters a normal working state (Step S216).

In the normal working state, the optical disc drive can execute a read command to read data from the optical disc. Alternatively, in the normal working state, the optical disc drive can execute a write command to write data into the optical disc. After the write command is executed, the disc management information in the temporary disc management area TDMA is updated at a proper time.

If the defective track is found or the defective track is generated while the write data is burnt to the optical disc by the optical disc drive, the disc management information in the temporary disc management area TDMA is also updated.

If the user intends to terminate the normal working state of the optical disc drive (Step S218), the optical disc is ejected from the optical disc drive (Step S222). At that time when the optical disc is ejected, the latest update of the disc management information is recorded into the temporary disc management area TDMA.

If the latest update of the disc management information would not be read successfully (Step S214) after the servo calibration process of the optical disc drive is performed (Step S212), the optical disc drive cannot enter the normal working state (Step S220). Under this circumstance, the optical disc is considered as an unknown disc and the disc is ejected from the optical disc drive directly (Step S222).

From the above discussions, the disc management information in the temporary disc management area TDMA is the very important information for the optical disc. If the disc management information cannot be read successfully after the optical disc is loaded, this optical disc is useless.

SUMMARY OF THE INVENTION

An embodiment of the present invention provides a method for backing up and restoring a disc management information. The method is executed in a disc archive. The disc archive includes a processing circuit and a storage device. The processing circuit is coupled with an optical disc drive. Firstly, a specified optical disc is loaded into the optical disc drive. After the optical disc drive performs a servo calibration process, the latest update of the disc management information of the specified optical disc is read. If the latest update of the disc management information is read successfully, the optical disc drive enters a normal working state. If the latest update of the disc management information is not read successfully, the latest update of the disc management information of the specified optical disc is acquired through the processing circuit, so that the optical disc drive enters the normal working state. While the normal working state of the optical disc drive is terminated, the latest update of the disc management information is transmitted to the processing circuit and recorded into the storage device. Then, the optical disc is ejected.

Another embodiment of the present invention provides a method for backing up and restoring a disc management information. The method is executed in a disc archive. The disc archive includes a processing circuit and a storage device. The processing circuit is coupled with an optical disc drive. Firstly, a specified optical disc is loaded into the optical disc drive. After the optical disc drive performs a servo calibration process, the latest update of the disc management information of the specified optical disc is acquired from the storage device through the processing circuit. Consequently, the optical disc drive enters the normal working state. While the normal working state of the optical disc drive is terminated, the latest update of the disc management information is transmitted to the processing circuit and recorded into the storage device. Then, the optical disc is ejected.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
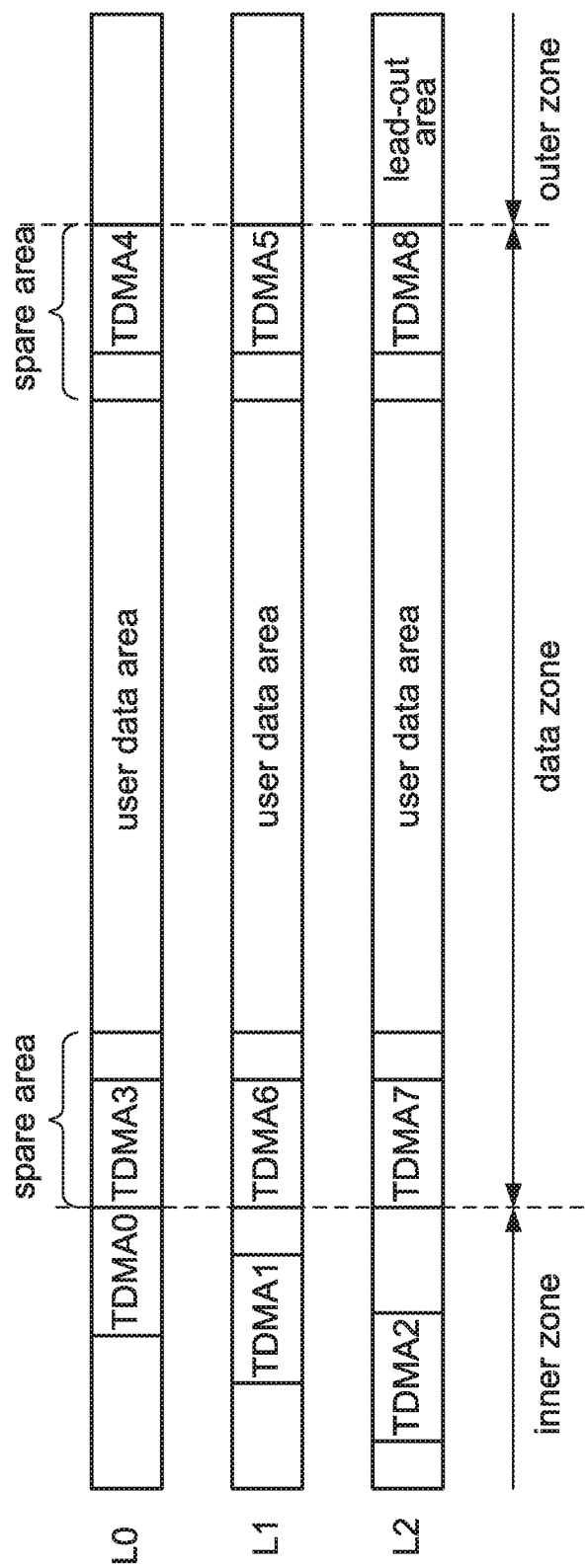
FIG. 1 (prior art) is a schematic diagram illustrating the data layout of a disc track.
Figure 2:
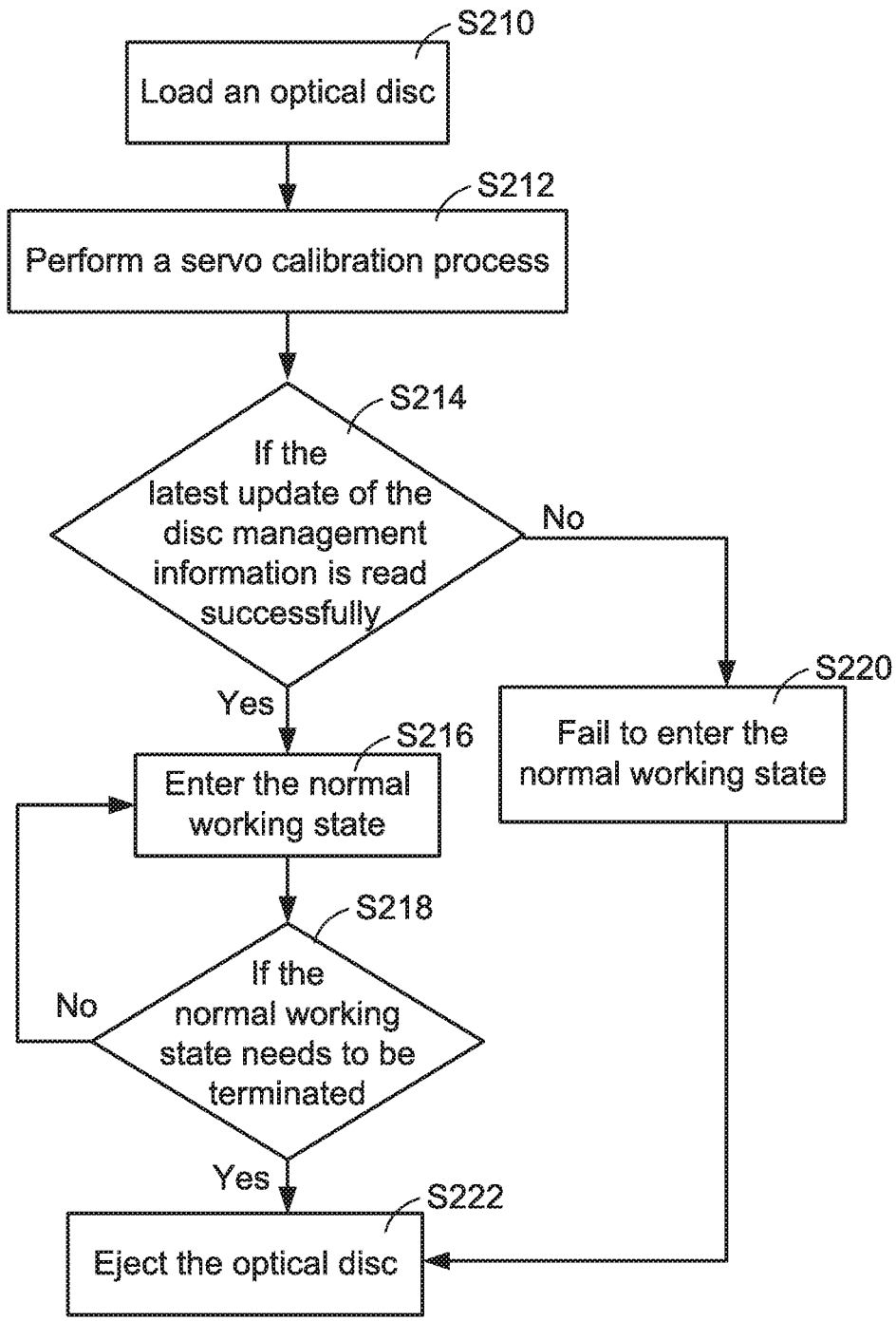
FIG. 2 (prior art) is a flowchart illustrating an operating method of a conventional optical disc drive.

As is well known, optical discs can retain data for a very long time. Consequently, the seldom-read cold data are usually stored in the optical discs. Recently, a large optical disc drive system such as a disc archive has been introduced into the market.

Generally, the disc archive comprises at least one optical disc drive, and the at least one optical disc drive is installed within the same casing. The disc archive comprises a processing circuit. The processing circuit is coupled with all optical disc drives in order to manage the operations of all optical disc drives. The disc archive further comprises plural disc carriers. Each disc carrier is used for carrying one optical disc. The processing circuit can control a robotic arm to remove an optical disc from the corresponding disc carrier and load the optical disc into the optical disc drive. Consequently, the optical disc drive can read data from the optical disc or write data into the optical disc.

The advanced disc archive contains ten optical disc drives, which are installed within the same casing. In addition, the disc archive contains three thousand disc carriers. Consequently, the processing circuit of the disc archive can remove ten optical discs from the corresponding disc carriers simultaneously and load the ten optical discs into ten optical disc drives simultaneously. Since the ten optical disc drives execute read commands or write commands simultaneously, the accessing performance of the disc archive is largely enhanced. In case that the disc archive contains three thousand triple-layer Blu-ray discs, the storage space of the disc archive reaches 3000×100G bytes. That is, the storage space of the disc archive is very large.

Generally, the optical disc has to meet the following specifications. When the optical disc is loaded into the optical disc drive under control of the processing circuit, the optical pickup head of the optical disc drive has to be moved to the temporary disc management area TDMA to read the latest update of the disc management information. After the optical disc drive confirms the status of the optical disc, the optical disc drive enters the normal working state. Consequently, the optical disc can be operated normally.

As mentioned above, if the disc management information cannot be read successfully after the optical disc is loaded, the optical disc drive cannot be used. For solving the above drawbacks, the present invention provides a method for backing up and restoring a disc management information. The method is applied to a disc archive. By using the method of the present invention, the optical disc drives in the disc archive can accurately acquire the disc management information.

As mentioned above, the disc archive comprises the processing circuit, the optical disc drives, the optical discs and the disc carriers. In addition, the disc archive further comprises a storage device. The storage device is coupled with the processing circuit. For example, the storage device is a hard disc drive (HD drive) or a solid state drive (SSD).

In accordance with the present invention, the latest update of the disc management information is transmitted from the optical disc drive to the processing circuit and backed up to the storage device of the disc archive before the optical disc is ejected from the optical disc drive.

If the optical disc drive is unable to successfully read the latest update of the disc management information from the temporary disc management area TDMA after the processing circuit controls the robotic arm to pick a specified optical disc from a specified disc carrier and load the specified optical disc into the optical disc drive, the processing circuit reads the latest update of the disc management information from the storage device of the disc archive and provides the latest update of the disc management information to the optical disc drive. Consequently, the optical disc drive enters the normal working state, and the optical disc can be operated normally.

Figure 3:
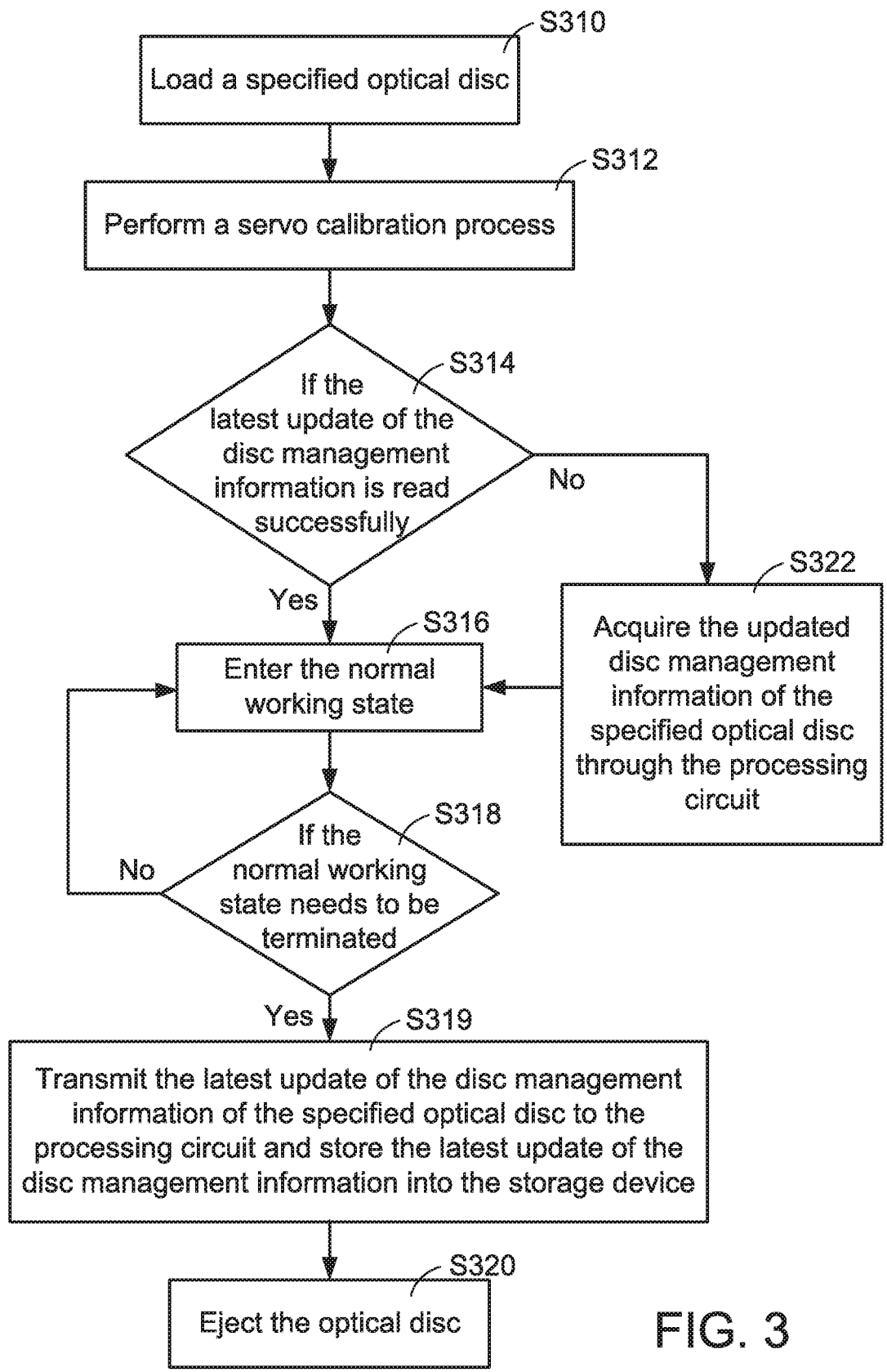
FIG. 3 is a flowchart illustrating an operating method of an optical disc drive in a disc archive according to a first embodiment of the present invention.

FIG. 3 is a flowchart illustrating an operating method of an optical disc drive in a disc archive according to a first embodiment of the present invention.

Firstly, under control of the processing circuit, a specified optical disc is removed from a specified disc carrier and loaded into the optical disc drive and an initialization process of the optical disc drive is performed (Step S310).

Then, a servo calibration process of the optical disc drive is performed (Step S312). During the servo calibration process, the optical pickup head of the optical disc drive emits a laser beam, and a laser power adjusting procedure, a focusing-on procedure and a tracking-on procedure are performed.

After the servo calibration process is completed, the optical pickup head is moved to the temporary disc management area TDMA to read the latest update of the disc management information. Then, a step S314 is performed to judge whether the latest update of the disc management information is read successfully. If the latest update of the disc management information is read successfully, the optical disc drive confirms the status of the optical disc. Meanwhile, the initialization process of the optical disc drive is completed, and the optical disc drive enters in a normal working state (Step S316).

In the normal working state, the optical disc drive can execute a read command to read data from the optical disc. Alternatively, in the normal working state, the optical disc drive can execute a write command to write data into the optical disc. After the write command is executed, the disc management information in the temporary disc management area TDMA is updated at a proper time.

If the defective track is found or the defective track is generated while the write data is burnt to the optical disc by the optical disc drive, the disc management information in the temporary disc management area TDMA is also updated.

If the processing circuit intends to terminate the normal working state of the optical disc drive (Step S318), a step S319 is performed. In the step S319, the latest update of the disc management information of the specified optical disc is transmitted from the optical disc drive to the processing circuit and stored into the storage device. Then, the specified optical disc is ejected from the optical disc drive (Step S320) and placed in the specified disc carrier.

After the specified optical disc is ejected from the optical disc drive, the latest update of the disc management information has been recorded in the temporary disc management area TDMA. In addition, the identical latest update of the disc management information has also been recorded in the storage device of the disc archive.

If the latest update of the disc management information would not be read from the temporary disc management area TDMA successfully (Step S314) after the servo calibration process of the optical disc drive is performed (Step S312), the optical disc drive acquires the latest update of the disc management information of the specified optical disc through the processing circuit (Step S322). Then, the optical disc drive enters in a normal working state (Step S316).

As mentioned above, the specified optical disc is placed in the specified disc carrier. In an embodiment, a mapping table about the relationship between the optical disc in each disc carrier and the corresponding disc management information is stored in the processing circuit of the disc archive.

For example, the three thousand disc carriers of the disc archive have optical discs therein, and each carrier has an index number associated with it. If the latest update of the disc management information of the specified optical disc in the disc carrier 1 cannot be read after the specified optical disc is removed from the disc carrier 1 and loaded into the optical disc drive, the processing circuit acquires the latest update of the disc management information from the storage device according to the index number of the disc carrier 1 and the mapping table. The latest update of the disc management information is transmitted from the processing circuit to the optical disc drive. Consequently, the optical disc drive can be normally operated.

Moreover, before the specified optical disc is ejected from the optical disc drive, the latest update of the disc management information is stored into the storage device by the processing circuit according to the mapping table and the index number of the disc carrier 1. Then, the specified optical disc is placed in the disc carrier 1.

In some embodiments, the optical disc drive inscribes a unique identification code on the specified optical disc in order to facilitate identification. Moreover, a mapping table about the relationship between each identification code and the corresponding disc management information is stored in the processing circuit of the disc archive. If the latest update of the disc management information of the specified optical disc cannot be read, the processing circuit acquires the latest update of the disc management information from the storage device according to the identification code of the specified optical disc and the mapping table. The latest update of the disc management information is transmitted from the processing circuit to the optical disc drive. Consequently, the optical disc drive can be normally operated.

It is noted that the above operating method can be further modified.

Figure 4:
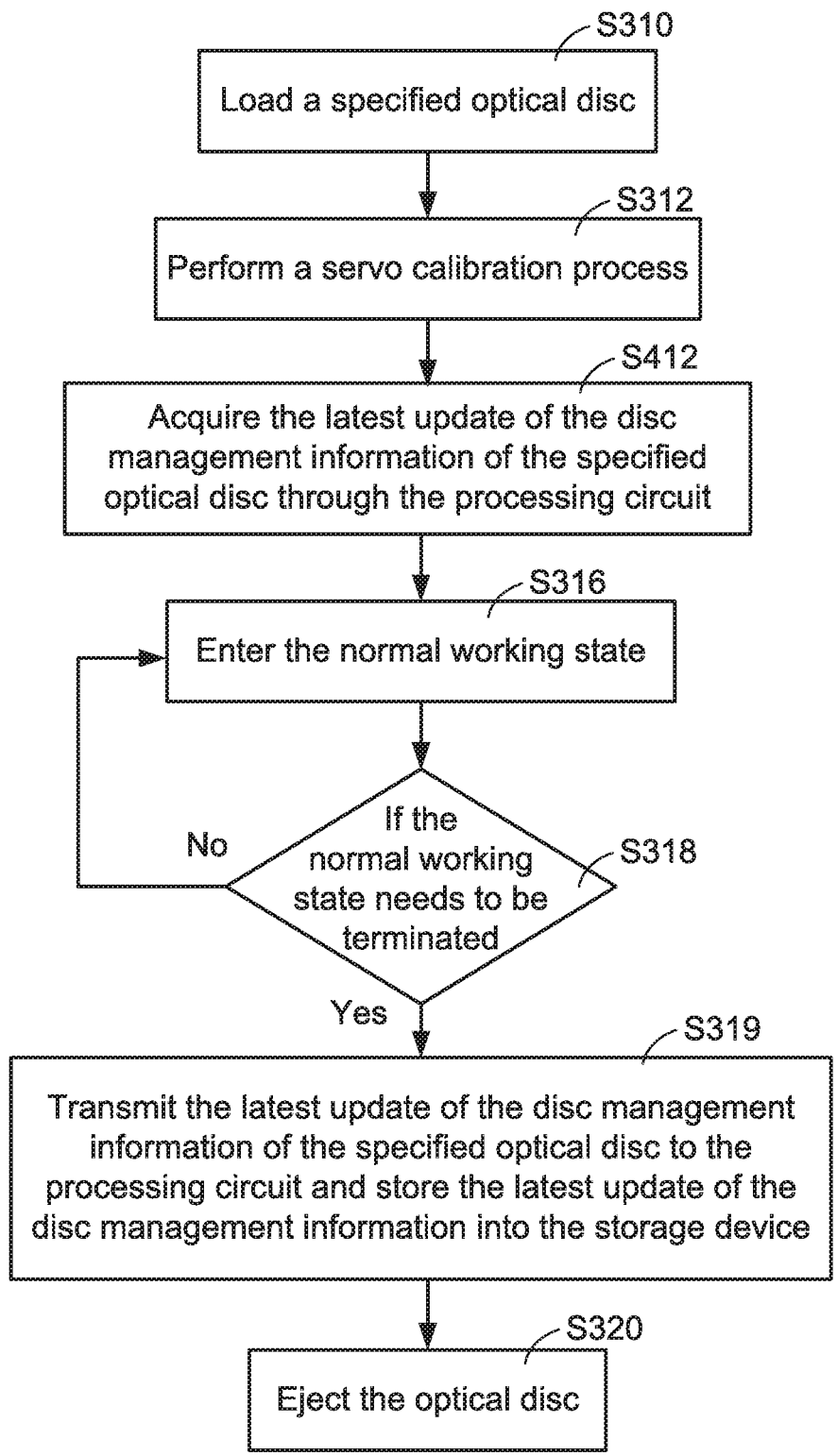
FIG. 4 is a flowchart illustrating an operating method of an optical disc drive in a disc archive according to a second embodiment of the present invention.

FIG. 4 is a flowchart illustrating an operating method of an optical disc drive in a disc archive according to a second embodiment of the present invention.

Firstly, the steps S310 and S312 are performed. The steps S310 and S312 are similar to those of the first embodiment, and are not redundantly described herein. In this embodiment, a step S412 is performed after the step S312. In the step S412, the optical disc drive acquires the latest update of the disc management information of the specified optical disc through the processing circuit.

That is, before the specified optical disc is ejected from the optical disc drive (Step S320), the latest update of the disc management information of the specified optical disc is transmitted from the optical disc drive to the processing circuit and stored into the storage device. When the specified optical disc is loaded into the optical disc drive again, the processing circuit acquires the latest update of the disc management information of the specified optical disc from the storage device and transmits the latest update of the disc management information to the optical disc drive.

From the above descriptions, the present invention provides a method for backing up and restoring a disc management information. The method is applied to a disc archive. By using the method of the present invention, the optical disc drives in the disc archive can accurately acquire the disc management information.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for backing up and restoring a disc management information, the method being executed in a disc archive, the disc archive comprising a processing circuit and a storage device, the processing circuit being coupled with an optical disc drive, the method comprising steps of:
loading a specified optical disc into the optical disc drive;
reading the latest update of the disc management information of the specified optical disc after the optical disc drive performs a servo calibration process;
if the latest update of the disc management information is read successfully, the optical disc drive entering a normal working state;
if the latest update of the disc management information is not read successfully, acquiring the latest update of the disc management information of the specified optical disc through the processing circuit, so that the optical disc drive enters the normal working state; and
while the normal working state of the optical disc drive is terminated, transmitting the latest update of the disc management information to the processing circuit, recording the latest update of the disc management information into the storage device, and ejecting the optical disc.

2. The method as claimed in claim 1, wherein the specified optical disc is removed from a specified disc carrier and loaded into the optical disc drive, wherein after the specified optical disc is ejected from the optical disc drive, the specified optical disc is placed in the specified disc carrier.

3. The method as claimed in claim 2, wherein the specified disc carrier has a specified index number, wherein if the latest update of the disc management information is not read successfully, the processing circuit acquires the latest update of the disc management information of the specified optical disc from the storage device according to the specified index number of the specified disc carrier and a mapping table and transmits the latest update of the disc management information to the optical disc drive.

4. The method as claimed in claim 3, wherein while the normal working state of the optical disc drive is terminated, the latest update of the disc management information is stored into the storage device by the processing circuit according to the specified index number of the disc carrier and the mapping table.

5. The method as claimed in claim 1, wherein the specified optical disc has an identification code, wherein if the latest update of the disc management information is not read successfully, the processing circuit acquires the latest update of the disc management information of the specified optical disc from the storage device according to the identification code of the specified optical disc and a mapping table and transmits the latest update of the disc management information to the optical disc drive.

6. The method as claimed in claim 5, wherein while the normal working state of the optical disc drive is terminated, the latest update of the disc management information is stored into the storage device by the processing circuit according to the identification code of the specified optical disc and the mapping table.

7. The method as claimed in claim 1, wherein the latest update of the disc management information is recorded in a temporary disc management area of the specified optical disc.

8. A method for backing up and restoring a disc management information, the method being executed in a disc archive, the disc archive comprising a processing circuit and a storage device, the processing circuit being coupled with an optical disc drive, the method comprising steps of:
loading a specified optical disc into the optical disc drive;
acquiring the latest update of the disc management information of the specified optical disc of the storage device through the processing circuit after the optical disc drive performs a servo calibration process, so that the optical disc drive enters the normal working state; and
while the normal working state of the optical disc drive is terminated, transmitting the latest update of the disc management information to the processing circuit, recording the latest update of the disc management information into the storage device, and ejecting the optical disc.

9. The method as claimed in claim 8, wherein the specified optical disc is removed from a specified disc carrier and loaded into the optical disc drive, wherein after the specified optical disc is ejected from the optical disc drive, the specified optical disc is placed in the specified disc carrier.

10. The method as claimed in claim 9, wherein the specified disc carrier has a specified index number, wherein if the latest update of the disc management information is not read successfully, the processing circuit acquires the latest update of the disc management information of the specified optical disc from the storage device according to the specified index number of the specified disc carrier and a mapping table and transmits the latest update of the disc management information to the optical disc drive.

11. The method as claimed in claim 10, wherein while the normal working state of the optical disc drive is terminated, the latest update of the disc management information is stored into the storage device by the processing circuit according to the specified index number of the disc carrier and the mapping table.

12. The method as claimed in claim 8, wherein the specified optical disc has an identification code, wherein if the latest update of the disc management information is not read successfully, the processing circuit acquires the latest update of the disc management information of the specified optical disc from the storage device according to the identification code of the specified optical disc and a mapping table and transmits the latest update of the disc management information to the optical disc drive.

13. The method as claimed in claim 12, wherein while the normal working state of the optical disc drive is terminated, the latest update of the disc management information is stored into the storage device by the processing circuit according to the identification code of the specified optical disc and the mapping table.

* * * * *